(12) United States Patent
Ahn et al.

(10) Patent No.: US 10,066,041 B2
(45) Date of Patent: Sep. 4, 2018

(54) THERMOPLASTIC RESIN, METHOD OF PREPARING THE SAME AND THERMOPLASTIC RESIN COMPOSITION INCLUDING THE SAME

(71) Applicant: LG CHEM, LTD., Seoul (KR)

(72) Inventors: Bong Keun Ahn, Daejeon (KR); Hyung Seop Shim, Daejeon (KR); Keun Hoon Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 61 days.

(21) Appl. No.: 15/510,654

(22) PCT Filed: Jun. 14, 2016

(86) PCT No.: PCT/KR2016/006296
§ 371 (c)(1),
(2) Date: Mar. 10, 2017

(87) PCT Pub. No.: WO2016/204485
PCT Pub. Date: Dec. 22, 2016

(65) Prior Publication Data
US 2017/0190824 A1    Jul. 6, 2017

(30) Foreign Application Priority Data
Jun. 15, 2015   (KR) ........................ 10-2015-0084390

(51) Int. Cl.
*C08F 279/02*    (2006.01)
*C08L 25/12*    (2006.01)

(52) U.S. Cl.
CPC ............ *C08F 279/02* (2013.01); *C08L 25/12* (2013.01)

(58) Field of Classification Search
CPC .................................. C08F 279/02; C08L 25/12
See application file for complete search history.

(56) References Cited

U.S. PATENT DOCUMENTS

| | | | |
|---|---|---|---|
| 4,535,117 A | 8/1985 | Mathis et al. | |
| 5,616,624 A * | 4/1997 | Witt | ............. C08J 9/20 521/56 |
| 2004/0192843 A1 * | 9/2004 | Chai | ............. C08F 279/04 525/70 |

FOREIGN PATENT DOCUMENTS

| | | |
|---|---|---|
| CN | 1119449 A | 3/1996 |
| CN | 1487961 A | 4/2004 |
| CN | 103582673 A | 2/2014 |
| KR | 10-2011-0037207 A | 4/2011 |
| KR | 10-2012-0061173 A | 6/2012 |
| KR | 10-2013-0082429 A | 7/2013 |
| KR | 10-2013-0090364 A | 8/2013 |

OTHER PUBLICATIONS

Office Action from Chinese Patent Office for Application No. 201680002803.8 dated Apr. 16, 2018.
International Search Report for PCT/KR2016/006296 filed on Jun. 14, 2016.

* cited by examiner

*Primary Examiner* — Mark S Kaucher

(57) ABSTRACT

The present invention relates to a thermoplastic resin, a method of preparing the same, and a thermoplastic resin composition including the same. A thermoplastic resin having superior latex stability and thermal stability and generating a small amount of gas during processing, and a method of preparing the thermoplastic resin are provided. In addition, a thermoplastic resin composition having superior mechanical properties, surface gloss, whiteness, gloss after retention, and heat discoloration after retention and a small content of residual total volatile organic compounds (TVOC), due to inclusion of the thermoplastic resin, is provided.

19 Claims, No Drawings

THERMOPLASTIC RESIN, METHOD OF PREPARING THE SAME AND THERMOPLASTIC RESIN COMPOSITION INCLUDING THE SAME

CROSS-REFERENCE TO RELATED APPLICATION(S)

This application is a U.S. National Stage of PCT/KR2016/006296, filed Jun. 14, 2016, which claims the priority benefit of Korean Patent Application No. 10-2015-0084390, filed on Jun. 15, 2015 in the Korean Intellectual Property Office, the disclosures of which are incorporated herein by reference.

The present invention relates to a thermoplastic resin, a method of preparing the same, and a thermoplastic resin composition including the same, and more particularly to a thermoplastic resin having superior latex stability and thermal stability and generating a small amount of gas during processing, a method of preparing the same, and a thermoplastic resin composition having superior mechanical properties, surface gloss, whiteness, gloss after retention, and heat discoloration after retention and a small content of residual total volatile organic compounds (TVOC) due to inclusion of the thermoplastic resin.

BACKGROUND ART

Acrylonitrile-butadiene-styrene (hereinafter referred to as ABS) resin has rigidity and chemical resistance, which are properties of acrylonitrile, and processability, mechanical strength, and aesthetics, which are properties of butadiene and styrene, thereby being applied to various products such as automotive products, electrical and electronic products, and office equipment.

In general, ABS resin or resins similar thereto are applied using a method of increasing an addition amount of a heat stabilizer to improve thermal stability and surface gloss, a method of removing a residual monomer by stripping an ABS copolymer latex, and a method of additionally adding water during coagulation and dehydration to minimize the residual content of an emulsifier, etc.

However, when an excessive amount of heat stabilizer is added, problems, such as deterioration in mechanical properties of a resin, may occur. In addition, when a stripping process is applied, a residual monomer can be usefully removed, but a separate process should be additionally performed. Accordingly, cost and time increase, and thus, productivity is decreased. Although the stripping process is applied, there are limitations in removing organic substances having a high volatilization temperature. In addition, when a residual emulsifier is removed by additionally adding water during coagulation and dehydration, the amount of wastewater increases, and a large amount of gas is generated from a residual emulsifier remaining also after a removal process during processing, whereby surface gloss is decreased.

PATENT DOCUMENT (Patent Document 1) JP1996-143634 A

DISCLOSURE

Technical Problem

Therefore, the present invention has been made in view of the above problems, and it is one object of the present invention to provide a thermoplastic resin having superior latex stability and thermal stability and generating a small amount of gas during processing.

It is another object of the present invention to provide a method of preparing the thermoplastic resin.

It is yet another object of the present invention to provide a thermoplastic resin composition exhibiting superior mechanical properties, surface gloss, whiteness, gloss after retention, and heat discoloration after retention and including a small amount of residual total volatile organic compounds (TVOC) therein, due to inclusion of the thermoplastic resin.

The above and other objects can be accomplished by the present invention described below.

Technical Solution

In accordance with an aspect of the present invention, the above and other objects can be accomplished by the provision of a thermoplastic resin, wherein the thermoplastic resin is prepared by polymerizing a monomer mixture including a rubber polymer latex, an aromatic vinyl compound, and a vinyl cyan compound; and a $C_5$ to $C_{20}$ conjugated unsaturated fatty acid salt.

In accordance with another aspect of the present invention, there is provided a method of preparing a thermoplastic resin, the method including a step of graft-polymerizing a monomer mixture including a rubber polymer latex, an aromatic vinyl compound, and a vinyl cyan compound; and a $C_5$ to $C_{20}$ conjugated unsaturated fatty acid salt.

In accordance with yet another aspect of the present invention, there is provided a thermoplastic resin composition, including the thermoplastic resin; and an aromatic vinyl compound-vinyl cyan compound copolymer.

Advantageous Effects

In accordance with the present invention, a thermoplastic resin having superior latex stability and thermal stability and generating a small amount of gas during processing is provided.

In addition, in accordance with the present invention, a method of preparing the thermoplastic resin is provided.

Further, in accordance with the present invention, a thermoplastic resin composition exhibiting superior mechanical properties, surface gloss, whiteness, gloss after retention, and heat discoloration after retention and including a small amount of residual total volatile organic compounds (TVOC) therein, due to inclusion of the thermoplastic resin, is provided.

Best Mode

Hereinafter, the present invention is described in detail.

The present inventors confirmed that, when a $C_5$ to $C_{20}$ conjugated unsaturated fatty acid salt is applied to a thermoplastic resin prepared by polymerizing a rubber polymer latex, an aromatic vinyl compound, and a vinyl cyan compound, a gas generation amount during processing is small and residual total volatile organic compounds (TVOC) content in a thermoplastic resin composition including the thermoplastic resin may be considerably lowered while maintaining the same or higher latex stability, although an emulsifier is used in a small amount compared to a conventional thermoplastic resin, thus completing the present invention.

Hereinafter, the thermoplastic resin according to the present invention is described in detail.

The thermoplastic resin is prepared by polymerizing a monomer mixture including a rubber polymer latex, an aromatic vinyl compound, and a vinyl cyan compound; and a $C_5$ to $C_{20}$ conjugated unsaturated fatty acid salt.

The rubber polymer latex may be, for example, a large-diameter rubber polymer latex having an average particle diameter of 2,500 to 5,000 Å, 2,500 to 4,500 Å, or 2,500 to 3,800 Å. Within this range, a polymerization conversion rate is high, whereby superior polymerization productivity and excellent impact strength are exhibited.

A gel content in the rubber polymer latex may be, for example, 80 to 99% by weight, 85 to 99% by weight, or 90 to 99% by weight. Within this range, graft copolymerization is effectively performed on the exteriors of rubber particles, whereby superior impact strength and thermal stability are provided.

The large-diameter rubber polymer latex may be prepared, for example, by enlarging a small-diameter rubber latex. The small-diameter rubber latex may have an average particle diameter of 100 to 2,000 Å, or 600 to 1,500 Å. A gel content in the small-diameter rubber latex may be, for example, 80 to 99% by weight, 85 to 99% by weight, or 90 to 99% by weight.

The rubber polymer latex may be included, for example, in an amount of 50 to 80% by weight, 55 to 80% by weight, or 55 to 75% by weight with respect to the monomer mixture based on solid content. Within this range, excellent mechanical properties are provided.

The aromatic vinyl compound may be, for example, one or more selected from the group consisting of styrene, α-methyl styrene, p-methyl styrene, vinyl toluene, t-butyl styrene, and chlorostyrene and substituents thereof.

The aromatic vinyl compound may be included, for example, in an amount of 15 to 30% by weight, 18 to 30% by weight, or 18 to 28% by weight with respect to the monomer mixture. Within this range, superior processability and property balance are provided.

The vinyl cyan compound may be, for example, one or more selected from the group consisting of acrylonitrile and methacrylonitrile and substituents thereof.

The vinyl cyan compound may be included, for example, in an amount of 1 to 20% by weight, 5 to 20% by weight, or 5 to 15% by weight with respect to the monomer mixture. Within this range, a coagulum is not generated during graft-polymerizing, whereby superior productivity is provided.

The conjugated unsaturated fatty acid salt may have, for example, a carbon number of 5 to 10, or 5 to 8. Within this range, superior latex stability is provided.

In another embodiment, the conjugated unsaturated fatty acid salt may have an unsaturation degree of 3 or more, 3 to 10, or 3 to 5. Within this range, the residual content of an emulsifier may be lowered.

The conjugated unsaturated fatty acid salt may be, for example, one or more selected from the group consisting of alkali metal or alkaline earth metal salts of sorbic acid. In another embodiment of the present invention, the conjugated unsaturated fatty acid salt may be a 50% by weight aqueous solution.

The conjugated unsaturated fatty acid salt may be, for example, included in an amount of 0.001 to 1.0 part by weight based on 100 parts by weight of the monomer mixture. Within this range, superior thermal stability is provided.

The thermoplastic resin may have, for example, a weight-average molecular weight of 30,000 to 250,000 g/mol, 50,000 to 200,000 g/mol, or 50,000 to 150,000 g/mol.

A coagulum content in the thermoplastic resin may be, for example, less than 0.12%, 0.01 to 0.10%, or 0.01 to 0.08%. Within this range, superior latex stability is provided.

A residual emulsifier content in the thermoplastic resin may be, for example, less than 23,000 ppm, 20,000 ppm or less, or 10,000 to 20,000 ppm. Within this range, a gas generation amount is reduced during processing, whereby superior surface gloss is exhibited.

A method of preparing the thermoplastic resin according to the present invention includes a step of graft-polymerizing a monomer mixture including a rubber polymer latex, an aromatic vinyl compound, and a vinyl cyan compound; and a $C_5$ to $C_{20}$ conjugated unsaturated fatty acid salt.

In the step of graft-polymerizing, for example, an emulsifier, a molecular weight regulator, and a polymerization initiator may be included.

The graft-polymerizing may be performed, for example, for 4 hours or less, or 1 to 4 hours.

The monomer mixture may be, for example, added batchwise, added continuously, or added by selectively mixing batchwise addition with continuous addition. As a specific example, 1 to 50% by weight, or 5 to 40% by weight of the monomer mixture may be added batchwise before reaction initiation, and the remainder of the monomer mixture may be continuously added over 1 to 4 hours after reaction initiation. In this case, a reaction time may be shortened and a graft rate may be controlled.

The conjugated unsaturated fatty acid salt, for example, may be added batchwise before reaction initiation or may be continuously added over 1 to 4 hours after reaction initiation.

The continuous addition, for example, may be performed by continuously adding dropwise or by a continuous stream, depending upon an addition amount of the conjugated unsaturated fatty acid salt.

When the conjugated unsaturated fatty acid salt is added with an emulsifier, the pH of the emulsifier (50% by weight aqueous solution) may be, for example, 6.0 to 12.0. Within this range, a stable polymerization environment is provided.

The emulsifier may be, for example, one or more selected from the group consisting of alkyl aryl sulfonate, alkali methyl alkyl sulfate, a fatty acid soap, an alkali metal salt of oleic acid, an alkali salt of rosin acid, and an alkali salt of lauric acid. In this case, a stable polymerization environment may be provided. In another embodiment of the present invention, the emulsifier may be a 50% by weight aqueous solution.

The emulsifier may be, for example, included in an amount of 0 to 1.0 part by weight, 0.001 to 0.8 parts by weight, or 0.1 to 0.5 parts by weight based on 100 parts by weight of the monomer mixture. Within this range, residual total volatile organic compounds (TVOC) content therein may be lowered.

The molecular weight regulator may be, for example, a mercaptan. As a specific example, the molecular weight regulator may be one or more selected from the group consisting of ethyl 2-mercaptopropionate, 2-mercaptoethanol, mercaptoacetic acid, n-octyl mercaptan, n-dodecyl mercaptan, and t-dodecyl mercaptan.

The molecular weight regulator may be, for example, included in an amount of 0.1 to 1.0, or 0.1 to 0.5 parts by weight based on 100 parts by weight of the monomer mixture. Within this range, superior mechanical properties and surface gloss are provided.

The polymerization initiator may be, for example, one or more liposoluble peroxide-based polymerization initiators selected from the group consisting of cumene hydroperoxide, diisopropylbenzene hydroperoxide, tertiary butyl hydroperoxide, p-methane hydroperoxide, and benzoyl peroxide.

In another embodiment of the present invention, the polymerization initiator may be an oxidation-reduction system polymerization initiator composed of one or more metal salts selected from the group consisting of iron (II), iron (III), cobalt (II), and cerium (VI); and one or more dihydroxyacetone polysaccharides selected from the group consisting of dextrose, glucose, and fructose or a polyamine-based reducing agent.

The liposoluble peroxide-based polymerization initiator and the oxidation-reduction system polymerization initiator, for example, may be used alone or as a mixture. The liposoluble peroxide-based polymerization initiator and the oxidation-reduction system polymerization initiator may be included in an amount of 0.01 to 1.0 part by weight, or 0.05 to 0.5 parts by weight based on 100 parts by weight of the monomer mixture.

A polymerization conversion rate of the graft-polymerizing may be, for example, greater than 97.5%, 98.0% or more, or 98.0 to 99.9%.

A graft rate of the graft-polymerizing may be, for example, 30 to 40%, or 31 to 38%, or 31.5 to 36%. Within this range, superior gloss is exhibited.

A method of preparing the thermoplastic resin may include, for example, a step of adding an antioxidant to a graft copolymer latex prepared by graft-polymerizing, followed by stirring. The antioxidant may be, for example, a powder-type phenolic antioxidant, phosphorus antioxidant, or sulfur-based antioxidant.

The step of adding the antioxidant, followed by stirring, may include, for example, a step of slowly adding an antioxidant with an average particle diameter of 0.5 to 2 µm in an emulsified state to a graft copolymer latex at 40 to 80° C., and continuously stirring the same before a coagulation process. In this case, an antioxidant has superior dispersibility, whereby superior heat stability is exhibited.

The antioxidant may be included in an amount of mixture 0.1 to 2 parts by weight or 0.1 to 1.5 parts by weight based on 100 parts by weight of the monomer. Within this range, superior heat stability is exhibited.

The method of preparing the thermoplastic resin, for example, may include a step of coagulating a graft copolymer latex prepared by graft-polymerization.

The coagulation step, for example, may be carried out by adding one or more coagulants selected from the group consisting of magnesium sulfate, calcium chloride, aluminum sulfate, sulfuric acid, phosphoric acid, and hydrochloric acid to the graft copolymer latex.

The coagulation step may be carried out, for example, at 75 to 95° C., or 80 to 95° C.

The method of preparing the thermoplastic resin may include, for example, a step of aging after the coagulation step. In this case, a residual monomer may be removed by volatilization.

The aging step may be carried out, for example, at 90 to 140° C., or 90 to 120° C.

The method of preparing the thermoplastic resin may include, for example, a step of drying the coagulated and/or aged graft copolymer latex.

The drying step may include, for example, a step of separating the coagulated and/or aged graft copolymer latex into a solid having a water content of 20 to 40% by removing moisture from the coagulated and/or aged graft copolymer latex by means of a dehydrator and then drying the separated solid using a hot air drying method. In this case, a drying time may be shortened by the dehydration, and the amount of a residual monomer may be reduced by the hot air drying.

A thermoplastic resin composition according to the present invention includes the thermoplastic resin; and an aromatic vinyl compound-vinyl cyan compound copolymer.

The thermoplastic resin composition may include, for example, 10 to 90% by weight, 10 to 70% by weight, or 10 to 50% by weight of the thermoplastic resin and 10 to 90% by weight, 30 to 90% by weight, or 50 to 90% by weight of the aromatic vinyl compound-vinyl cyan compound copolymer. Within this range, mechanical properties, such as impact resistance, are superior and excellent processability is provided.

The aromatic vinyl compound-vinyl cyan compound copolymer may have a weight-average molecular weight of, for example, 50,000 to 300,000 g/mol, 80,000 to 250,000 g/mol, or 100,000 to 200,000 g/mol. Within this range, superior property balance is provided.

The aromatic vinyl compound may be may be one or more selected from the group consisting of, for example, styrene, α-methyl styrene, p-methyl styrene, vinyl toluene, t-butyl styrene, and chlorostyrene and substituents thereof.

The aromatic vinyl compound may be included in an amount of, for example, 10 to 90% by weight, or 30 to 80% by weight, or 50 to 80% by weight with respect to the aromatic vinyl compound-vinyl cyan compound copolymer. Within this range, superior mechanical properties and processability are provided.

The vinyl cyan compound may be one or more selected from the group consisting of, for example, acrylonitrile and methacrylonitrile and substituents thereof.

The vinyl cyan compound may be included in an amount of, for example, 10 to 90% by weight, 20 to 70% by weight, or to 50% by weight with respect to the aromatic vinyl compound-vinyl cyan compound copolymer. Within this range, superior mechanical properties and chemical resistance are exhibited.

A final rubber content in the thermoplastic resin composition may be, for example, 5 to 40% by weight, or 10 to 30% by weight. Within this range, superior impact strength is exhibited.

Residual Total volatile organic compounds (TVOC) content in the thermoplastic resin composition may be, for example, 1,150 ppm or less, 900 ppm or less, or 100 to 700 ppm.

The thermoplastic resin composition may optionally include an additive, for example, such as a heat stabilizer, a light stabilizer, an antioxidant, an antistatic agent, an antimicrobial agent, or a lubricant in a range within which the properties of the thermoplastic resin composition are not affected.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

Small-Diameter Rubber Latex Preparation 100 parts by weight of 1,3-butadiene, 1 to 4 parts by weight of a fatty acid soap as an emulsifier, 0.1 to 0.6 parts by weight of potassium persulfate as a polymerization initiator, 0.1 to 1.0 part by weight of potassium carbonate as an electrolyte, 0.1 to 0.5 parts by weight of tertiary dodecylmercaptan as a molecular weight regulator, and 90 to 130 parts by weight of ion-exchanged water were added batchwise and reaction was allowed for 7 to 12 hours at 50 to 65° C. Subsequently, 0.05 to 1.2 parts by weight of tertiary dodecylmercaptan, as a molecular weight regulator, was additionally added batchwise thereto and reaction was allowed for 5 to 15 hours at 55 to 70° C. As a result, a small-diameter rubber latex, an average particle diameter of which was 600 to 1,500 Å and in which a gel content was 85 to 99% by weight was prepared.

Large-Diameter Rubber Latex Preparation 1 to 4 parts by weight of an aqueous acetic acid solution was slowly added to 100 parts by weight (based on solid content) of the obtained small-diameter rubber latex over one hour to enlarge particles. As a result, a large-diameter rubber latex, an average particle diameter of which was 3,400 Å and in which a gel content was 97% by weight, was prepared.

Thermoplastic Resin Preparation 65 parts by weight of the obtained large-diameter rubber latex (based on solid content), 140 parts by weight of ion-exchanged water, 5 parts by weight of styrene, and 2 parts by weight of acrylonitrile were added batchwise to a nitrogen-substituted polymerization reactor, and then 0.05 parts by weight of cumene hydroperoxide, 0.09 parts by weight of sodium pyrophosphate, 0.12 parts by weight of dextrose, and 0.002 parts by weight of ferrous sulfide were added batchwise thereto while maintaining the temperature of the reactor at 50° C. Subsequently, a mixture including 20 parts by weight of styrene, 8 parts by weight of acrylonitrile, 0.25 parts by weight of t-dodecylmercaptan, and 0.12 parts by weight of cumene hydroperoxide was continuously added thereto over two hours while elevating the temperature of the reactor to 75° C. In addition, 0.4 parts by weight of a potassium salt of rosin acid as an emulsifier (based on solid content, a 50% by weight aqueous solution) and 0.1 parts by weight of potassium sorbate as a conjugated unsaturated fatty acid salt (based on solid content, a 50% by weight aqueous solution) were continuously added over two hours while adding the mixture.

After completing the continuous addition, 0.06 parts by weight of cumene hydroperoxide, 0.04 parts by weight of sodium pyrophosphate, 0.06 parts by weight of dextrose, and 0.001 parts by weight of ferrous sulfide were added batchwise thereto. The temperature of the reactor was elevated to 80° C. over 20 minutes and this elevated temperature was maintained for 40 minutes, followed by terminating the reaction. As a result, a graft copolymer latex was obtained. Here, a polymerization conversion rate, a coagulum content, a graft rate, and latex stability are summarized in Table 1 below.

0.5 parts by weight of an antioxidant (wingstay-L/IR1076=0.8/0.2) emulsion having an average particle diameter of 0.9 μm was added to the obtained graft copolymer latex. Subsequently, first coagulation was carried out at 88° C. in the presence of 2.3 parts by weight of magnesium sulfate and secondary aging was carried out at 97° C. As a result, a powder-type graft copolymer, in which a moisture content was approximately 30%, was obtained. A residual emulsifier content is summarized in Table 1 below.

Thermoplastic Resin Composition Preparation

The obtained powder-type graft copolymer was dried, whereby a graft copolymer powder in which a moisture content was less than 1% was obtained. Subsequently, 1.5 parts by weight of a lubricant and 0.2 parts by weight of an antioxidant were added to 100 parts by weight of a resin mixture composed of 23% by weight of the graft copolymer; and 77% by weight of a styrene-acrylonitrile copolymer, a weight-average molecular weight of which was 140,000 g/mol and in which an acrylonitrile content was 24% by weight, followed by melting and kneading at 200 to 300° C. by means of a twin-screw extruder. As a result, a pellet-type resin composition was prepared. The prepared pellet-type resin composition was injection molded into a specimen in which a final rubber content was 15% by weight. The properties of the specimen were measured according to the following methods. Results are summarized in Table 2.

Example 2

An experiment was carried out in the same manner as in Example 1, except that, upon preparation of the thermoplastic resin of Example 1, a potassium salt of rosin acid, as an emulsifier, and potassium sorbate, as a conjugated unsaturated fatty acid salt, were added together batchwise when a large-diameter rubber latex was added.

Example 3

An experiment was carried out in the same manner as in Example 1, except that, upon preparation of the thermoplastic resin of Example 1, a potassium salt of rosin acid, as emulsifier, was not added and 0.4 parts by weight (based on solid content, a 50% by weight aqueous solution) of potassium sorbate, as a conjugated unsaturated fatty acid salt, was added.

Example 4

An experiment was carried out in the same manner as in Example 1, except that, upon preparation of the thermoplastic resin of Example 1, a potassium salt of rosin acid, as emulsifier, was not added, and 0.4 parts by weight (based on solid content, a 50% by weight aqueous solution) of potassium sorbate, as a conjugated unsaturated fatty acid salt, was added batchwise when a large-diameter rubber latex was added.

Example 5

An experiment was carried out in the same manner as in Example 1, except that, upon preparation of the thermoplastic resin of Example 1, the temperature of a nitrogen-substituted polymerization reactor was maintained at 50° C. after adding 70 parts by weight (based on solid content) of a large-diameter rubber latex, 140 parts by weight of ion-exchanged water, 4.9 parts by weight of styrene, and 2.1 parts by weight of acrylonitrile batchwise to the nitrogen-substituted polymerization reactor, and 0.05 parts by weight of cumene hydroperoxide, 0.09 parts by weight of sodium pyrophosphate, 0.12 parts by weight of dextrose, and 0.002 parts by weight of ferrous sulfide were added thereto batchwise, followed by continuously adding a mixture including 16.56 parts by weight of styrene, 6.44 parts by weight of acrylonitrile, 0.2 parts by weight of t-dodecylmercaptan, and 0.12 parts by weight of cumene hydroperoxide thereto over an hour and a half while elevating the temperature of the nitrogen-substituted polymerization reactor to 75° C. When the mixture was added, 0.3 parts by weight (based on solid content, a 50% by weight aqueous solution) of a potassium salt of rosin acid, as an emulsifier, and 0.1 parts by weight (based on solid content, a 50% by weight aqueous solution) of potassium sorbate, as a conjugated unsaturated fatty acid salt, were continuous added thereto over an hour and a half. A final rubber content in the prepared specimen was 16% by weight.

Example 6

An experiment was carried out in the same manner as in Example 1, except that, upon preparation of the thermoplastic resin of Example 1, the temperature of a nitrogen-substituted polymerization reactor was maintained at 50° C. after adding 60 parts by weight (based on solid content) of a large-diameter rubber latex and 140 parts by weight of ion-exchanged water batchwise to the nitrogen-substituted polymerization reactor, and 0.05 parts by weight of cumene hydroperoxide, 0.09 parts by weight of sodium pyrophosphate, 0.12 parts by weight of dextrose, and 0.002 parts by weight of ferrous sulfide were added thereto batchwise, followed by continuously adding a mixture including 28.8 parts by weight of styrene, 11.2 parts by weight of acrylonitrile, 0.35 parts by weight of t-dodecylmercaptan, and 0.12 parts by weight of cumene hydroperoxide thereto over two and a half hours while elevating the temperature of the nitrogen-substituted polymerization reactor to 75° C. When the mixture was added, 0.3 parts by weight (based on solid content, a 50% by weight aqueous solution) of a potassium salt of rosin acid, as an emulsifier, and 0.1 parts by weight (based on solid content, a 50% by weight aqueous solution) of potassium sorbate, as a conjugated unsaturated fatty acid salt, were continuous added thereto over two and a half hours. A final rubber content in the prepared specimen was 14% by weight.

Example 7

An experiment was carried out in the same manner as in Example 1, except that, upon preparation of the thermoplastic resin of Example 1, 0.1 parts by weight (based on solid content, a 50% by weight aqueous solution) of sodium sorbate, as a conjugated unsaturated fatty acid salt, was added instead of potassium sorbate.

Example 8

An experiment was carried out in the same manner as in Example 1, except that, upon preparation of the thermoplastic resin of Example 1, a potassium salt of rosin acid, as emulsifier, was not added, and 0.4 parts by weight (based on solid content, a 50% by weight aqueous solution) of sodium sorbate, as conjugated unsaturated fatty acid salt, was added batchwise, instead of potassium sorbate, when a large-diameter rubber latex was added.

Comparative Example 1

An experiment was carried out in the same manner as in Example 1, except that, upon preparation of the thermoplastic resin of Example 1, 0.4 parts by weight of tertiary dodecylmercaptan was added instead of 0.25 parts by weight of t-dodecylmercaptan, the potassium salt of rosin acid was added in an amount of 1.0 part by weight instead an amount of 0.4 parts by weight, and potassium sorbate, as a conjugated unsaturated fatty acid salt, was not added.

Test Example

The properties of the thermoplastic resins prepared according to Examples 1 to 6 and Comparative Example 1 were measured according to the following methods. Results are summarized in Table 1 below. Similarly, the properties of the thermoplastic resin compositions prepared according to Example 1 to 6 and Comparative Example 1 were measured according to the following methods. Results are summarized in Table 2.

Measurement Method

Gel content (% by weight): A rubber latex was solidified using a dilute acid or a metal salt thereof and then washed. The washed product was dried in a 60° C. vacuum oven for 24 hours and then an obtained rubber mass was finely cut with scissors. Subsequently, 1 g of a rubber slice was placed in 100 g of toluene and stored for 48 hours in a dark room at room temperature (16 to 26° C.), and then separated into a sol and a gel. A gel content was calculated according to Mathematical Equation 1 below:

[Mathematical Equation 1]

$$\text{Gel Content (\% by weight)} = \frac{\text{Weight of Insoluble Matter (Gel) (g)}}{\text{Wight of Sample (g)}} \times 100$$

Average particle diameter and particle diameter distribution (Å): Measured according to a dynamic laser light scattering method by means of Nicomp 370HPL.

Polymerization conversion rate (%): 1.5 g of a graft copolymer latex was dried for 15 minutes in a 150° C. hot air dryer, and then weighed. A total solids content (TSC) was determined and a polymerization conversion rate was calculated according to Mathematical Equation 2 below:

Polymerization Conversio Rate (%) Total Solid Content (TSC)×(Parts by WeigIt of Added Monomer and Supplementary material)/100−(Parts by Weight of Added Supplementary Material Except For Monomer)     [Mathematical Equation 2]

Coagulum content (%): the weight of a coagulum generated in a reactor, a total weight of rubber, and the weight of a monomer were measured, and a coagulum content was calculated according to Mathematical Equation 3 below.

[Mathematical Equation 3]

$$\text{Solid Coagulum Content (\%)} = \frac{\text{Weight of Coagulum Generated in Reactor (g)}}{\text{Total Weight of Rubber and Monomer}} \times 100$$

Residual emulsifier content (ppm): 0.2 g of a graft copolymer powder was fed into a 50 ml vial, and then 10 ml of acetone was added thereto, followed by sonication for two hours to dissolve a sample. 30 ml of methanol was slowly added thereto to precipitate a copolymer, and then sonication was carried out for one hour. As a result, an additive was extracted. Subsequently, a supernatant was separated from the additive and then filtered. Subsequently, measurement was performed by HPLC/DAD (diode array detector)/MSD (mass selective detector) using the Agilent 1100 system.

Graft rate (%): 2 g of a graft copolymer powder was added to 300 ml of acetone, followed by stirring for 24 hours. A resultant solution was separated by means of an ultracentrifuge. The separated acetone solution was added to methanol dropwise to obtain a non-grafted portion. The obtained non-grafted portion was dried and weighed. Using the measured weight, a graft rate was calculated according to Mathematical Equation 4 below.

[Mathematical Equation 4]

$$\text{Graft Rate (\%)} = \frac{\text{Weight of Grafted Monomer (g)}}{\text{Weight of Rubber (g)}} \times 100$$

Latex Stability Test (min): 12,000 rpm of rotational force was applied to 100 g (based on solid content) of a graft copolymer latex using an ultrahigh speed emulsifier/disperser by means of a T.K ROBOMIX manufactured by PRIMIX. In this case, a time (min) until creaming due to destruction of stability was measured.

measurement at 45° according to a standard measurement method, ASTM D528. In addition, a derivation value (gloss before retention—gloss after retention) was calculated. The smaller a measured value is, the better gloss after retention is.

Heat discoloration after retention (E): A pellet obtained by means of an extruder was placed in an injection molding machine and retained at 270° C. for 15 minutes. As a result, a specimen for measuring heat discoloration was obtained. Using the obtained specimen and a specimen injection molded without retention at 200° C., L, a, and b values before retention and L', a', and b' values after retention were determined by means of a Suga color computer. The degree of heat discoloration retention was calculated according to Mathematical Equation 5.

$$\Delta E = \sqrt{(L'-L)^2 + (a'-a)^2 + (b'-b)^2}$$ [Mathematical Equation 5]

Total volatile organic compounds (TVOC) content (ppm): Measured by Headspace-GC/MSD by means of an Agilent 6890N GC-FID using 1 g of a specimen. Here, the specimen was dissolved in 50 ml of toluene, and 5 μl of toluene (standard sample) in which the specimen was dissolved at a concentration of 0.02 g/ml was used for analysis. Subsequently, a relative integral value of each peak for 100 μg/g of toluene was calculated.

TABLE 1

| Classification | Examples | | | | | | | | Comparative Example |
| --- | --- | --- | --- | --- | --- | --- | --- | --- | --- |
| | 1 | 2 | 3 | 4 | 5 | 6 | 7 | 8 | 1 |
| Polymerization conversion reate (%) | 99.0 | 99.2 | 98.9 | 98.9 | 98.9 | 98.5 | 98.8 | 98.6 | 97.5 |
| Coagulum content (%) | 0.03 | 0.03 | 0.02 | 0.02 | 0.03 | 0.04 | 0.04 | 0.04 | 0.12 |
| Residual emulsifier content (ppm) | 16,000 | 15,500 | 13,500 | 13,500 | 15,000 | 15,000 | 15,000 | 13,000 | 23,000 |
| Graft rate (%) | 34 | 33.5 | 33.5 | 33.7 | 31.0 | 35.0 | 33.5 | 33.3 | 31.0 |
| Latex stability (min) | 20 | 20 | 23 | 23 | 23 | 22 | 19 | 22 | 25 |

Impact strength (Notched Izod, kg·cm/cm): Measured using a ¼" specimen according to a standard measurement method, ASTM D256.

Melt index (MI, g/10 min): Measured at 220° C. under a load of 10 kg for 10 minutes using a specimen according to a standard measurement method, ASTM D1238.

Tensile strength (kg/cm²): Measured using a specimen according to a standard measurement method, ASTM D638.

Surface gloss: Measured at 45° using a specimen according to a standard measurement method, ASTM D528.

Whiteness (W.I): A disc specimen (1.5 mm) was injected and W.I was measured by means of a Suga color computer.

Gloss after retention: A pellet obtained by means of an extruder was placed in an injection molding machine and retained at 270° C. for 15 minutes. As a result, a specimen for measuring gloss was obtained. The obtained specimen and a specimen injection molded without retention at 200° C. were subjected to gloss As shown in [Table 1], it can be confirmed that the graft copolymer latexes of Examples 1 and 2 and 5 to 7 prepared according to the present invention maintain the same or higher latex stability, compared to a conventional case, even when a small amount of emulsifier is added and exhibits a superior polymerization conversion rate, coagulum content, and graft rate. In addition, it can be confirmed that a residual emulsifier content in the graft copolymer from the graft copolymer latex is remarkably reduced. Further, it can be confirmed that, in the cases of the graft copolymer latexes of Examples 3, 4 and 8 in which an emulsion aid, potassium sorbate or sodium sorbate, was only added as an emulsifier, a superior polymerization conversion rate, coagulum content, and graft rate are exhibited while maintaining the same or higher latex stability, and a residual emulsifier content in the graft copolymers obtained from the graft copolymer latexes is remarkable decreased. On the other hand, it can be confirmed that, in the case of Comparative Example 1 in which an emulsifier was added in a general addition amount, the residual emulsifier content is still high.

TABLE 2

| Classification | Examples | | | | | | | | Comparative Example |
| --- | --- | --- | --- | --- | --- | --- | --- | --- | --- |
| | 1 | 2 | 3 | 4 | 5 | 6 | 7 | 8 | 1 |
| Impact strength (kg · cm/cm) | 24.0 | 23.5 | 23.4 | 23.8 | 24.0 | 23.0 | 23.8 | 23.3 | 21.0 |
| Melt index (g/10 min) | 21.0 | 21.5 | 21.0 | 21.3 | 21.0 | 21.5 | 20.8 | 20.8 | 21.0 |
| Tensile strength (kg/cm2) | 510 | 512 | 513 | 511 | 509 | 509 | 509 | 510 | 515 |
| Surface gloss | 109.5 | 109.5 | 109.0 | 109.3 | 109.4 | 108.4 | 109.2 | 109.1 | 106.5 |
| Whiteness | 58 | 58 | 59 | 59 | 60 | 58 | 58 | 59 | 55 |
| Gloss after Retention | 2.5 | 2.6 | 2.6 | 2.8 | 2.1 | 2.6 | 2.4 | 2.5 | 4.5 |
| Heat discoloration after retention | 3.5 | 3.5 | 3.1 | 3.0 | 3.3 | 3.6 | 3.4 | 3.0 | 5.2 |
| TVOC (ppm) | 630.5 | 628.6 | 601.1 | 599.3 | 612.2 | 622.2 | 629.8 | 600.5 | 1,169.7 |

As shown in [Table 2], it can be confirmed that, in the cases of the thermoplastic resin compositions of Examples 1 to 8 prepared according to the present invention, improved impact strength, superior surface gloss, whiteness, gloss after retention, and heat discoloration after retention, and a remarkably reduced residual total volatile organic compounds content are exhibited while maintaining the same or higher melt index and tensile strength, compared to Comparative Example 1 in which an emulsifier was added in an general addition amount.

From these results, it can be confirmed that, when the emulsion aid according to the present invention is used, an addition amount of an emulsifier may be minimized, and the residual content of an emulsifier may be remarkably reduced due to the characteristic of the emulsion aid which is washed with a small amount of water during coagulation and dehydration, whereby gas generation during processing due to the residual emulsifier is reduced and thus surface gloss is improved. In addition, it can be confirmed that, due to the residual total volatile organic compounds content reduction, a thermoplastic resin composition having superior thermal stability and exhibiting excellent surface gloss also after processing may be prepared.

The invention claimed is:

1. A thermoplastic resin, wherein the thermoplastic resin is prepared by polymerizing a monomer mixture comprising a rubber polymer latex, an aromatic vinyl compound, and a vinyl cyan compound; and a $C_5$ to $C_{20}$ conjugated unsaturated fatty acid salt.

2. The thermoplastic resin according to claim 1, wherein the rubber polymer latex is a large-diameter rubber polymer latex having a particle diameter of 2,500 to 5,000 Å.

3. The thermoplastic resin according to claim 1, wherein a gel content in the rubber polymer latex is 80 to 99% by weight.

4. The thermoplastic resin according to claim 1, wherein the rubber polymer latex is comprised in an amount of 50 to 80% by weight with respect to the monomer mixture based on solid content.

5. The thermoplastic resin according to claim 1, wherein the aromatic vinyl compound is one or more selected from the group consisting of styrene, α-methyl styrene, p-methyl styrene, vinyl toluene, t-butyl styrene, and chlorostyrene and substituents thereof.

6. The thermoplastic resin according to claim 1, wherein the aromatic vinyl compound is comprised in an amount of 15 to 30% by weight with respect to the monomer mixture.

7. The thermoplastic resin according to claim 1, wherein the vinyl cyan compound is one or more selected from the group consisting of acrylonitrile and methacrylonitrile and substituents thereof.

8. The thermoplastic resin according to claim 1, wherein the vinyl cyan compound is comprised in an amount of 1 to 20% by weight with respect to the monomer mixture.

9. The thermoplastic resin according to claim 1, wherein the conjugated unsaturated fatty acid salt has a carbon number of 5 to 10.

10. The thermoplastic resin according to claim 1, wherein the conjugated unsaturated fatty acid salt has an unsaturation degree of 3 or more.

11. The thermoplastic resin according to claim 1, wherein the conjugated unsaturated fatty acid salt is comprised in an amount of 0.001 to 1.0 part by weight based on 100 parts by weight of the monomer mixture.

12. The thermoplastic resin according to claim 1, wherein a residual emulsifier content in the thermoplastic resin is less than 23,000 ppm.

13. A method of preparing a thermoplastic resin, the method comprising a step of graft-polymerizing a monomer mixture comprising a rubber polymer latex, an aromatic vinyl compound, and a vinyl cyan compound; and a $C_5$ to $C_{20}$ conjugated unsaturated fatty acid salt.

14. The method according to claim 13, wherein 1 to 50% by weight of the monomer mixture is added batchwise before reaction initiation, and a remainder of the monomer mixture is continuously added over 1 to 4 hours after reaction initiation.

15. The method according to claim 13, wherein the conjugated unsaturated fatty acid salt is added batchwise before reaction initiation or is continuously added over 1 to 4 hours after reaction initiation.

16. The method according to claim 13, wherein, in the step of graft-polymerizing, an emulsifier is further comprised.

17. A thermoplastic resin composition, comprising the thermoplastic resin according to claim 1; and an aromatic vinyl compound-vinyl cyan compound copolymer.

18. The thermoplastic resin composition according to claim 17, wherein the thermoplastic resin is comprised in an amount of 10 to 50% by weight, and the aromatic vinyl compound-vinyl cyan compound copolymer is comprised in an amount of 50 to 90% by weight.

19. The thermoplastic resin composition according to claim 17, wherein residual total volatile organic compounds (TVOC) content in the thermoplastic resin composition is 1,150 ppm or less.

\* \* \* \* \*